No. 655,531. Patented Aug. 7, 1900.
O. WALLMAN.
DEVICE FOR FASTENING CORDS.
(Application filed Apr. 11, 1900.)

(No Model.)

WITNESSES:
Herbert Bradley.
F. M. Dapper.

INVENTOR
Otto Wallman
by Daniel L. Wolcott
Att'y.

UNITED STATES PATENT OFFICE.

OTTO WALLMAN, OF SPOKANE, WASHINGTON, ASSIGNOR OF ONE-HALF TO CHARLES W. GEIB, OF SAME PLACE.

DEVICE FOR FASTENING CORDS.

SPECIFICATION forming part of Letters Patent No. 655,531, dated August 7, 1900.

Application filed April 11, 1900. Serial No. 12,450. (No model.)

*To all whom it may concern:*

Be it known that I, OTTO WALLMAN, a citizen of Sweden, residing at Spokane, in the county of Spokane and State of Washington, have invented or discovered certain new and useful Improvements in Devices for Fastening Cords, of which improvement the following is a specification.

The invention described herein relates to certain improvements for means for forming loops or knots in cords in such manner as will not only prevent the slipping of the knot, but will also permit of its easy disengagement when necessary.

In general terms the invention consists in a block having parallel or substantially-parallel holes therethrough and in the further provision of a groove around the block between the holes, as hereinafter more fully described and claimed.

Figure 1:
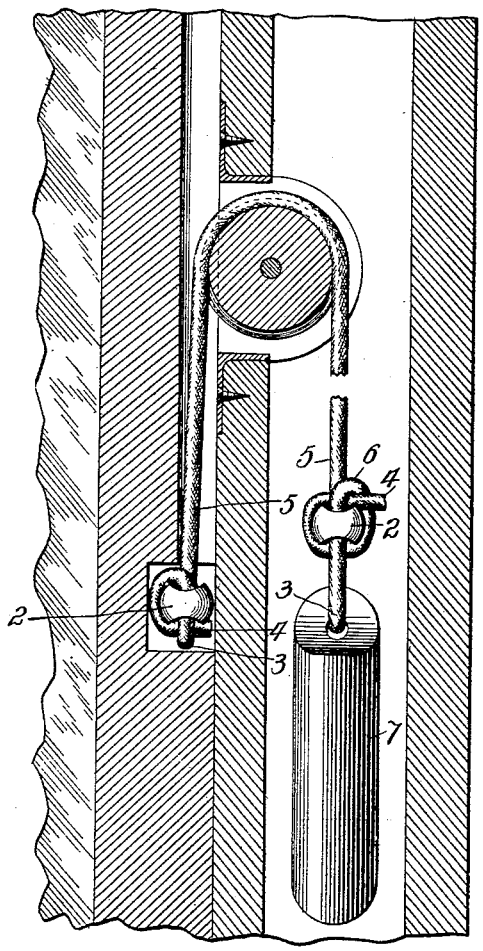
Figure 2:
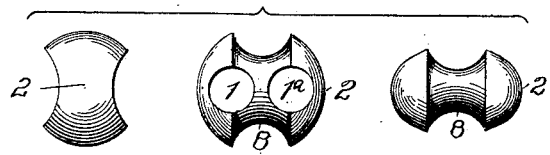

In the accompanying drawings, forming a part of this specification, Figure 1 is a sectional elevation of portions of a window-frame and sash, the balance-cord being connected to the sash and weight by my improved fastening device. Fig. 2 shows in elevation different portions of the fastening device.

In the practice of my invention parallel or approximately-parallel holes 1 1ª are formed through a block 2 of any suitable material, the dimensions of the block varying in accordance with the requirements of use. These holes are of a diameter slightly greater than that of the cord with which the fastener is to be used and arranged a distance apart approximately equal to the diameter of the cord. In using this block or fastening device the end of the cord is passed through one hole and in the opposite direction through the other hole, forming a loop 3. If it be desired to form an enlargement in the cord, as at the left in Fig. 1, the end 4 of the cord is passed partly around the block and under the loop 3, which is then contracted and caused to clamp the end 4 by pulling the portion 5 of the cord through the block.

If it be desired to form a loop in the cord or to connect the cord to an object, as the weight 7, one end of the cord is passed through one of the holes in the block, as before, around the object or through a hole therein and through the other hole in the block. The end of the cord is then passed around the block and under a loop 6, formed in passing the cord around the block. By drawing on one leg or part of the loop 3 the loop 7 will be contracted and caused to bind the end 4 against the block. It will be readily understood that as long as the cord is subjected to strain the end of the cord will be firmly held as against slipping, but that the block can be easily released by pushing the part 5 through the block, enlarging the loop 3, or by pushing one leg of the loop 3 through the block, enlarging the loop 6. By the relative arrangement of the holes and the groove the loop of the cord is caused to bind against the end of the cord for nearly half the perimeter of such end.

It is preferred to form a groove 8 around the block between the holes 1 and 1ª for the reception of the portion of the cord passing around the block, as shown in the drawings.

I claim herein as my invention—

A fastening device for fastening cords consisting of a block having a peripheral groove of a width approximately equal to the diameter of the cord to be used, and having parallel holes therethrough, said holes being of a diameter approximately equal to the diameter of the cord and extending into opposite sides of the groove, substantially as set forth.

In testimony whereof I have hereunto set my hand.

OTTO WALLMAN.

Witnesses:
C. W. GEIB,
C. B. SYPHERT.